US008830219B2

(12) United States Patent
Choi et al.

(10) Patent No.: US 8,830,219 B2
(45) Date of Patent: Sep. 9, 2014

(54) ORGANIC LIGHT EMITTING DISPLAY DEVICE CAPABLE OF COMPENSATING THRESHOLD VOLTAGE OF A DRIVING TRANSISTOR AND DRIVING METHOD THEREOF

(75) Inventors: Sang-Moo Choi, Yongin (KR); Chul-Kyu Kang, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 282 days.

(21) Appl. No.: 12/828,043

(22) Filed: Jun. 30, 2010

(65) Prior Publication Data

US 2011/0090200 A1 Apr. 21, 2011

(30) Foreign Application Priority Data

Oct. 19, 2009 (KR) ........................ 10-2009-0099214

(51) Int. Cl.
*G06F 3/038* (2013.01)
*G09G 5/00* (2006.01)
*G09G 3/32* (2006.01)

(52) U.S. Cl.
CPC ........ *G09G 3/3233* (2013.01); *G09G 2320/043* (2013.01); *G09G 2300/0819* (2013.01); *G09G 2310/0262* (2013.01); *G09G 2300/0852* (2013.01); *G09G 2310/0251* (2013.01)
USPC ............................................ 345/211; 345/76

(58) Field of Classification Search
USPC .................................................. 345/76, 211
See application file for complete search history.

(56) References Cited

U.S. PATENT DOCUMENTS

| | | | | |
|---|---|---|---|---|
| 8,237,639 | B2 * | 8/2012 | Yamashita et al. | 345/82 |
| 2006/0022305 | A1 * | 2/2006 | Yamashita | 257/565 |
| 2008/0211397 | A1 * | 9/2008 | Choi | 313/504 |
| 2008/0211796 | A1 * | 9/2008 | Kim | 345/204 |
| 2009/0244050 | A1 * | 10/2009 | Yamamoto et al. | 345/212 |
| 2010/0220038 | A1 * | 9/2010 | Chung et al. | 345/76 |

FOREIGN PATENT DOCUMENTS

| | | |
|---|---|---|
| JP | 2007-140318 | 6/2007 |
| JP | 2007-206590 | 8/2007 |
| JP | 2008-026467 | 2/2008 |
| KR | 10-2006-0057280 | 5/2006 |
| KR | 10-2007-0100146 | 10/2007 |
| KR | 1020070112714 A | 11/2007 |
| KR | 10-2007-0118857 | 12/2007 |

OTHER PUBLICATIONS

KIPO Office action dated Apr. 29, 2011, for Korean priority Patent application 10-2009-0099214, 4 pages.
KIPO Office Action for Korean priority patent application No. 10-2009-0099214, dated Jul. 29, 2011, 1 page.

* cited by examiner

*Primary Examiner* — Kwang-Su Yang
(74) *Attorney, Agent, or Firm* — Christie, Parker & Hale, LLP

(57) ABSTRACT

An organic light emitting display device includes: a plurality of pixels at crossing regions of a plurality of scan lines and data lines; a first control line and a second control line commonly connected with the plurality of pixels; a control line driver configured to supply a first control signal to the first control line and a second control signal to the second control line, where the second control signal is not concurrent with the first control signal; and a first power supply that supplies a first power to each of the plurality of pixels, where a voltage level of the first power is configured to change at least once during a frame period for each of the pixels.

12 Claims, 10 Drawing Sheets

ORGANIC LIGHT EMITTING DISPLAY DEVICE CAPABLE OF COMPENSATING THRESHOLD VOLTAGE OF A DRIVING TRANSISTOR AND DRIVING METHOD THEREOF

CROSS-REFERENCE TO RELATED APPLICATIONS

This application claims priority to and the benefit of Korean Patent Application No. 10-2009-0099214, filed in the Korean Intellectual Property Office on Oct. 19, 2009, the entire content of which is incorporated herein by reference.

BACKGROUND

1. Field

The embodiment of the present invention relates to an organic light emitting display device and a driving method thereof.

2. Description of Related Art

In recent years, various flat panel display devices with reduced weight and volume in comparison to a cathode ray tube have been developed. Examples of the flat panel display devices include a liquid crystal display device, a field emission display device, a plasma display panel, and an organic light emitting display device.

An organic light emitting display device displays images by using organic light emitting diodes that emit light by recombination of electrons and holes. Such an organic light emitting display device has a rapid response speed and is driven with low power consumption.

An organic light emitting display device includes a plurality of pixels that are arranged in a matrix at crossing regions of a plurality of data lines, scan lines, and power lines. Each pixel typically includes an organic light emitting diode, two or more transistors including a driving transistor, and one or more capacitors.

A disadvantage of such an organic light emitting display device is that the amount of current that flows to the organic light emitting diode varies depending on a threshold voltage of the driving transistor provided in each of the pixels. Characteristics of the driving transistor provided in each of the pixels vary due to inconsistencies of a manufacturing process of the driving transistor. It is difficult to manufacture the transistors used in each of the pixels in the organic light emitting display device to have the same characteristics given the current processing technology. This results in variability in the threshold voltage of the driving transistors in each of the pixels, which causes a non-uniform display luminance.

A compensation circuit including a plurality of transistors and capacitors in each of the pixels is added to the organic light emitting display device. The compensation circuit included in each of the pixels charges a voltage corresponding to a threshold voltage of the driving transistor to thereby compensate for the variability in threshold voltages among the driving transistors in each of the pixels.

A driving method using a frequency of 120 Hz or more has been required in order to remove a motion blur phenomenon. However, in the case of high-speed driving at 120 Hz or more, a charging duration of the threshold voltage of the driving transistor is shortened, such that compensation of the threshold voltage of the driving transistor may become impossible.

SUMMARY

An aspect of an embodiment of the present invention is directed toward an organic light emitting display device capable of compensating a threshold voltage of a driving transistor for a sufficient time to thereby implement high-speed driving and a driving method thereof.

According to a first embodiment of the present invention, an organic light emitting display device includes: a plurality of pixels at crossing regions of a plurality of scan lines and a plurality of data lines; a first control line and a second control line commonly connected with the plurality of pixels; a control line driver configured to supply a first control signal to the first control line and a second control signal to the second control line, where the second control signal is not concurrent with the first control signal; and a first power supply configured to supply a first power to each of the plurality of pixels, where a voltage level of the first power is configured to change at least once during a frame period for each of the plurality of pixels.

According to a second embodiment of the present invention, an organic light emitting display device includes: a plurality of pixels at crossing regions of a plurality of scan lines and data lines; a first control line and a second control line commonly connected with the plurality of pixels; a control line driver that is configured to supply a first control signal to the first control line and a second control signal to the second control line, where the first control signal is not concurrent with the first control signal; a scan driver that is configured to sequentially supply a scan signal to the plurality of scan lines during a compensation period of the frame period; and a data driver configured to supply a data signal to the plurality of data lines, where the data signal is configured to be synchronized with the scan signal during the compensation period.

According to a third embodiment of the present invention, a driving method of an organic light emitting display device includes: setting a voltage of an anode electrode of an organic light emitting diode included in each of a plurality of pixels at an initial voltage during a reset period of a frame period; applying a data signal to a gate electrode of a driving transistor included in each of the plurality of pixels during a compensation period, where the compensation period occurs after a reset period of the frame period; and applying a current corresponding to the data signal to the organic light emitting diode during an emission period, where the emission period occurs after the compensation period of the frame period.

According to a fourth embodiment of the present invention, a driving method of an organic light emitting display device includes: applying a data signal to a gate electrode of a driving transistor included in each of a plurality of pixels during a compensation period of a frame period; and applying a current corresponding to the data signal to an organic light emitting diode included in each of the plurality of pixels during an emission period, where the emission period occurs after the compensation period of the frame period, where the applying of the data signal to the gate electrode includes sequentially applying a scan signal to a plurality of scan lines; setting an anode electrode of the organic light emitting diode to an initial voltage, where the initial voltage corresponds to the scan signal; applying the data signal to the gate electrode of the driving transistor; and maintaining a common node at a reference voltage during a period when the scan signal is applied, where the common node is between a first capacitor and a second capacitor, where the first capacitor and the second capacitor are connected in series between the gate electrode of the driving transistor and the organic light emitting diode.

In an embodiment of the present invention, it is possible to compensate for a threshold voltage of a driving transistor for a sufficient time by allocating an appropriate compensation period to allow for high-speed driving. Further, since an embodiment of an organic light emitting display device may be driven in simultaneous emission and non-emission schemes, both the first control line and the second control line may be connected to each of the plurality of pixels, thereby simplifying the structure and reducing manufacturing cost.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
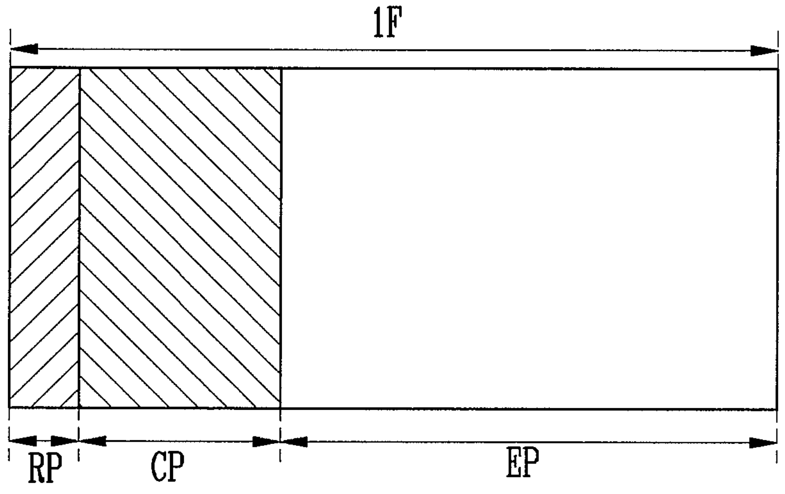
FIG. 1 is a diagram showing one frame according to an embodiment of the present invention.

In the following detailed description, only certain exemplary embodiments of the present invention are shown and described, by way of illustration. As those skilled in the art would recognize, the invention may be embodies in many different forms and should not be construed as being limited to the embodiments set forth herein. Also, in the context of the present application, when a first element is described as being "coupled to" a second element, the first element may be directly coupled to the second element or may also be indirectly coupled to the second element with one or more intervening elements interposed there between. Further, some of the elements that are not essential to the complete understanding of the invention are omitted for clarity. Also, like reference numerals refer to like elements throughout the specification.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

Hereinafter, embodiments of the present invention will be described in more detail with reference to FIGS. 1 to 8 so that those skilled in the art can easily implement the present invention.

FIG. 1 is a diagram showing one frame period according to an embodiment of the present invention.

Referring to FIG. 1, one frame 1F according to the embodiment of the present invention includes a reset period RP, a compensation period CP, and an emission period EP.

During the reset period RP, an initial voltage is supplied to an anode electrode of an organic light emitting diode (OLED) included in each of the plurality of pixels. During the reset period, each of the plurality of pixels is set to a non-emission state.

A threshold voltage of a driving transistor is compensated for in each of the plurality of pixels during the compensation period CP. That is, during the compensation period CP, each of the pixels is charged with a voltage corresponding to the threshold voltage of the driving transistor. During the compensation period CP, each of the pixels is set to the non-emission state.

During the emission period EP, each of the pixels emits light having a luminance determined by the current flowing through the organic light emitting diode of each pixel. Since the threshold voltage of the driving transistor is compensated for during the compensation period CP, the current flowing through the organic light emitting diode is independent of the threshold voltage of the driving transistor. Thus, an image having a uniform luminance is displayed during the emission period EP regardless of any variability in threshold voltage among the driving transistors included in each of the pixels that make up the organic light emitting display device.

In the above-mentioned embodiment of the present invention, a period of the compensation period CP is set to sufficiently compensate for the threshold voltage of the driving transistor. That is, in an embodiment of the present invention, the compensation period CP can be set to sufficiently compensate for the threshold voltage of the driving transistor, even when the driving transistor is driven by a frequency of 120 Hz or more. Thus, an image having a uniform luminance may be displayed. Further, in an embodiment of the present invention, since each of the pixels is switched into an emission or non-emission state at the same time, a first control line and a second control line that control emission or non-emission may be connected to each of the pixels, thereby simplifying both structure and driving.

In an embodiment of the present invention, a frame period may include only a compensation period CP and an emission period EP to correspond to a structure of a pixel. A detailed description thereof will be described below with reference to the structure of the pixel.

Figure 2:
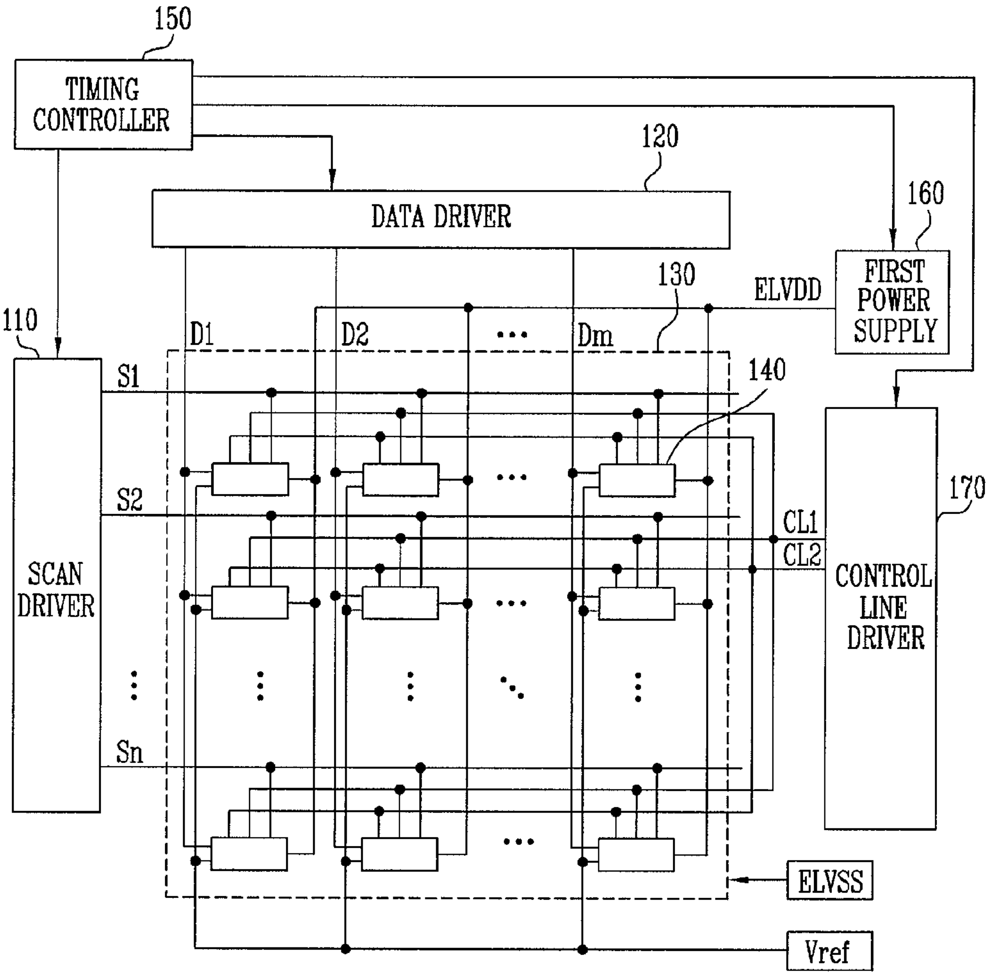
FIG. 2 is a diagram showing an organic light emitting display device according to an embodiment of the present invention.

FIG. 2 is a diagram showing an organic light emitting display device according to an embodiment of the present invention.

Referring to FIG. 2, the organic light emitting display device according to an embodiment of the present invention includes a plurality of pixels 140 positioned to access a plurality of scan lines S1 to Sn and data lines D1 to Dm; a scan driver 110 for driving the scan lines S1 to Sn; a data driver 120 for driving the data lines D1 to Dm; a first power supply 160 for generating a first power ELVDD; a control line driver 170 for driving a first control line CL1 and a second control line CL2; and a timing controller 150 for controlling the scan driver 110, the data driver 120, the first power supply 160, and the control line driver 170.

The scan driver 110 supplies a scan signal to the scan lines S1 to Sn during a second period of the reset period RP. Further, the scan driver 110 sequentially supplies the scan signal to the scan lines S1 to Sn during the compensation period CP.

The data driver 120 supplies a reset voltage to the data lines D1 to Dm during the reset period RP. Further, the data driver 120 supplies a data signal to the data lines D1 to Dm. The data signal is synchronized with the scan signal during the compensation period CP.

The first power supply 160 supplies a first low power (or a first power at a low level) ELVDD_L, also called an initial voltage, having a low level during the reset period RP and supplies a first high power (or a first power at a high level) ELVDD_H having a high level during the compensation period CP and the emission period EP. Herein, the first low power ELVDD_L is set to a voltage lower than the voltage of the data signal. In addition, the first high power ELVDD_H is set to a voltage higher than both the data signal voltage Vdata and the reference voltage Vref.

The control line driver 170 supplies a second control signal to the second control line CL2 during the compensation period CP and the second period of the reset period RP. In addition, the control line driver 170 supplies a first control signal to the first control line CL1 during the emission period EP and a first period of the reset period RP. Herein, supplying the first control signal and the second control signal refers to supplying voltages at sufficient levels to transistors to switch on the transistors that are coupled to the first control line CL1 and the second control line CL2.

The timing controller 150 controls the scan driver 110, the data driver 120, the first power supply 160, and the control line driver 170 to correspond to synchronization signals supplied from an outside source.

A pixel unit 130 receives the first power ELVDD, a second power ELVSS and the reference voltage Vref from an outside source and supplies each to each of the plurality of pixels 140. Each of the plurality of pixels 140 sets the voltage of the anode electrode of the organic light emitting diode OLED to the first low power ELVDD_L during the reset period RP. In addition, each of the pixels 140 is charged with a voltage corresponding to a threshold voltage of a driving transistor during the compensation period CP and emits light corresponding to the data signal during the emission period EP.

Meanwhile, the first high power ELVDD_H, the first low power ELVDD_L, the data signal voltage Vdata, and the reference voltage Vref are set as shown in Equation 1.

$$ELVDD\_H > Vref \geq Vdata > ELVDD\_L \qquad \text{Equation 1}$$

Referring to Equation 1, the first low power ELVDD_L is set to a voltage lower than the data signal voltage Vdata. Actually, the first low power ELVDD_L is set to a voltage lower than a voltage resulting from subtracting the threshold voltage of the driving transistor from the data signal voltage Vdata. In addition, the reference voltage Vref is set to a voltage equal to or higher than the data signal voltage Vdata. The first high power ELVDD_H is set to a voltage higher than the reference voltage Vref.

Figure 3:
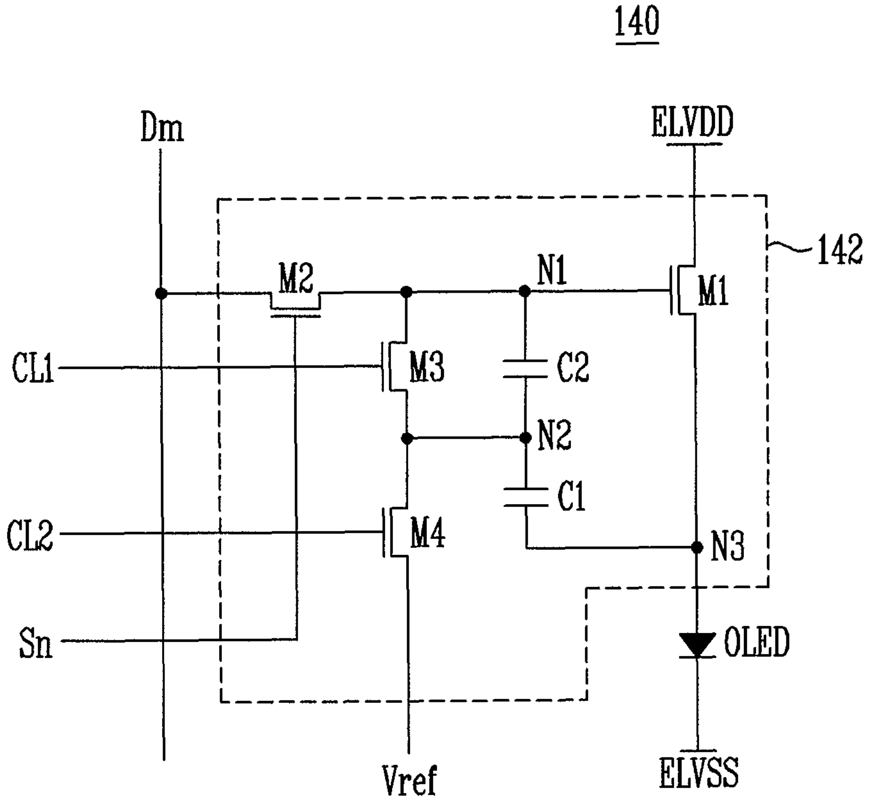
FIG. 3 is a circuit diagram showing a pixel according to a first embodiment of the present invention.

FIG. 3 is a diagram showing a pixel 140 according to a first embodiment of the present invention. In FIG. 3, the pixel 140 connected to the n-th scan line Sn and the m-th data line Dm is shown for convenience of description.

Referring to FIG. 3, the pixel 140 according to the first embodiment of the present invention includes the organic light emitting diode OLED and a pixel circuit 142 that is connected to the data line Dm, the scan line Sn, the first control line CL1, and the second control line CL2. Each of the data line Dm, the scan line Sn, the first control line C11, and the second control line CL2 contribute to the control of the organic light emitting diode OLED.

An anode electrode of the organic light emitting diode OLED is connected to the pixel circuit 142, and a cathode electrode of the organic light emitting diode OLED is connected to the second ELVSS. The organic light emitting diode OLED emits light having a luminance that is determined by a current supplied from the pixel circuit 142.

The pixel circuit 142 initializes the anode electrode of the organic light emitting diode OLED to the first low power ELVDD_L during the reset period RP and charges voltage corresponding to the data signal and the threshold voltage of the driving transistor during the compensation period CP. In addition, the current corresponding to the voltage charged during the emission period EP is supplied to the organic light emitting diode OLED. For this, the pixel circuit 142 includes first to fourth transistors M1, M2, M3 and M4, a first capacitor C1, and a second capacitor C2.

A gate electrode of the first transistor M1, also called a driving transistor, is connected to a first node N1, and a first electrode of the first transistor M1 is connected to the first power ELVDD. In addition, a second electrode of the first transistor M1 is connected to the anode electrode of the organic light emitting diode OLED. That is, the second electrode of the first transistor M1 is connected to the organic light emitting diode OLED at a third node N3. The voltage at the first node N1 controls the first transistor M1, which in turn controls the amount of current supplied to the organic light emitting diode OLED. The amount of current supplied to the organic light emitting diode OLED corresponds with the voltage of the first power ELVDD and the voltage at the first node N1.

A gate electrode of the second transistor M2 is connected to the scan line Sn and a first electrode of the second transistor M2 is connected to the data line Dm. In addition, a second electrode of the second transistor M2 is connected to the first node N1. The second transistor M2 is switched on when the scan signal is supplied to the scan line Sn. When the second transistor M2 is switched on, the first node N1 is electrically connected to the data line Dm.

A gate electrode of the third transistor M3 is connected to the first control line CL1, and a second electrode of the third transistor M3 is connected to the first node N1. Because the first node N1 is connected to the gate electrode of the first transistor M1, the second electrode of the third transistor M3 is connected to the gate electrode of the first transistor M1. In addition, a first electrode of the third transistor M3 is connected to the second node N2. The third transistor M3 is switched on when the first control signal is supplied to the first control line CL1. When no first control signal is supplied to the first control line CL1, the third transistor M3 is switched off.

A gate electrode of the fourth transistor M4 is connected to the second control line CL2, and a first electrode of the fourth transistor M4 is connected to the reference voltage Vref. In addition, a second electrode of the fourth transistor M4 is connected to the second node N2. The fourth transistor M4 is switched on when the second control signal is supplied to the second control line CL2. When no second control signal is supplied to the second control line CL2, the fourth transistor M4 is switched off.

A first capacitor C1 and a second capacitor C2 are connected in series between a first node N1 and a third node N3. The second node N2, located between the first capacitor C1 and the second capacitor C2 is also connected to the first electrode of the third transistor M3 and the second electrode of the fourth transistor M4. Herein, the second capacitor C2 and the third transistor M3 are connected between the first node N1 and the second node N2 in parallel.

FIGS. 4A to 4D are waveform diagrams showing an embodiment of a driving method of a pixel 140 shown in FIG. 3 with pixel circuit 142.

Figure 4A:
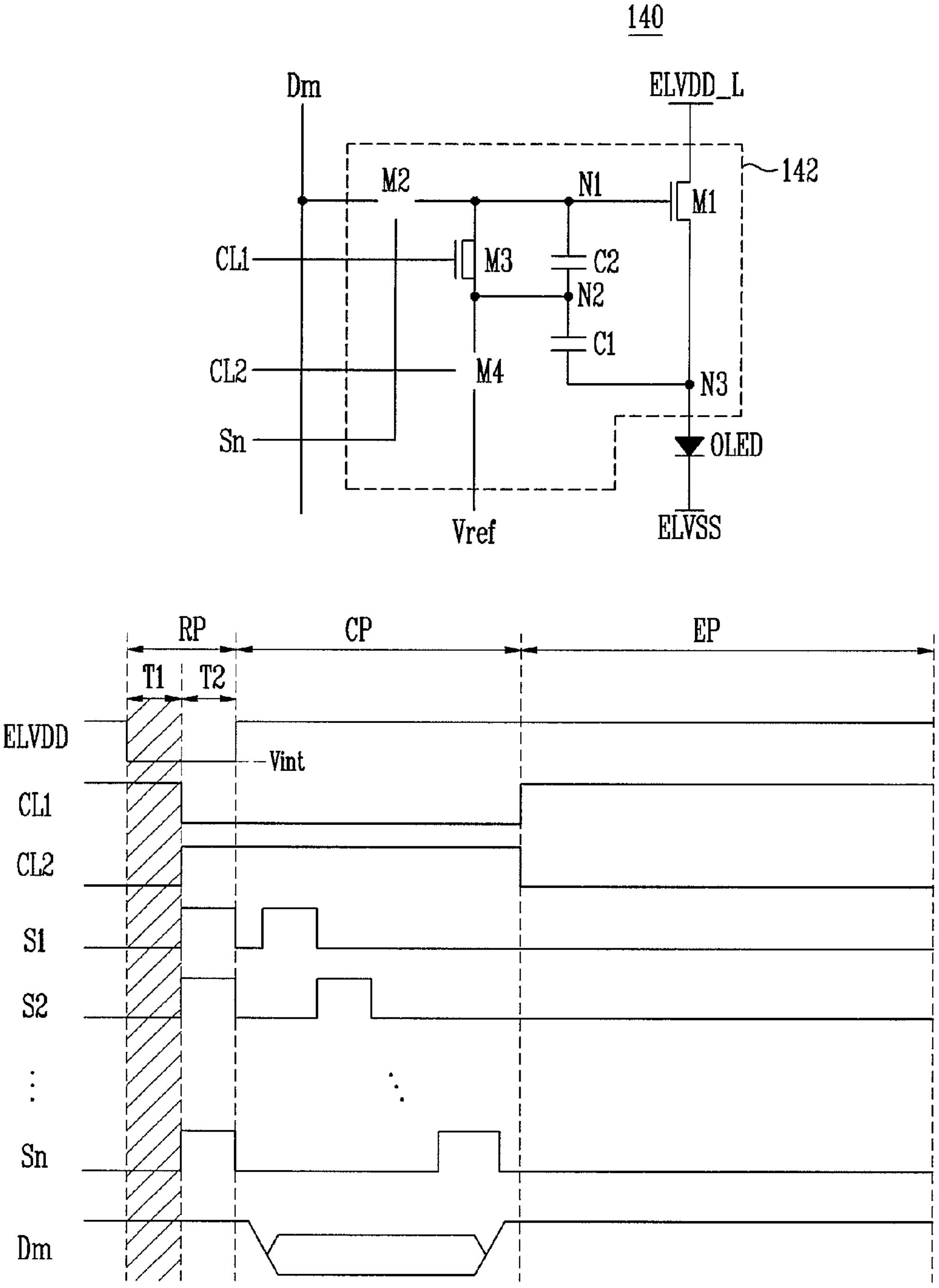
FIGS. 4A to 4D are waveform diagrams showing an embodiment of a driving method of a pixel shown in FIG. 3.

Herein, an operation process is described in more detail. First, the first control signal CL1 is supplied during a first period T1 of the reset period RP as shown in FIG. 4A. When the first control signal CL1 is supplied, the third transistor M3 is switched on, such that the first node N1 and the second node N2 are electrically connected to each other. The initial voltage Vint, also called the first power ELVDD_L, is supplied during the reset period RP.

Figure 4B:
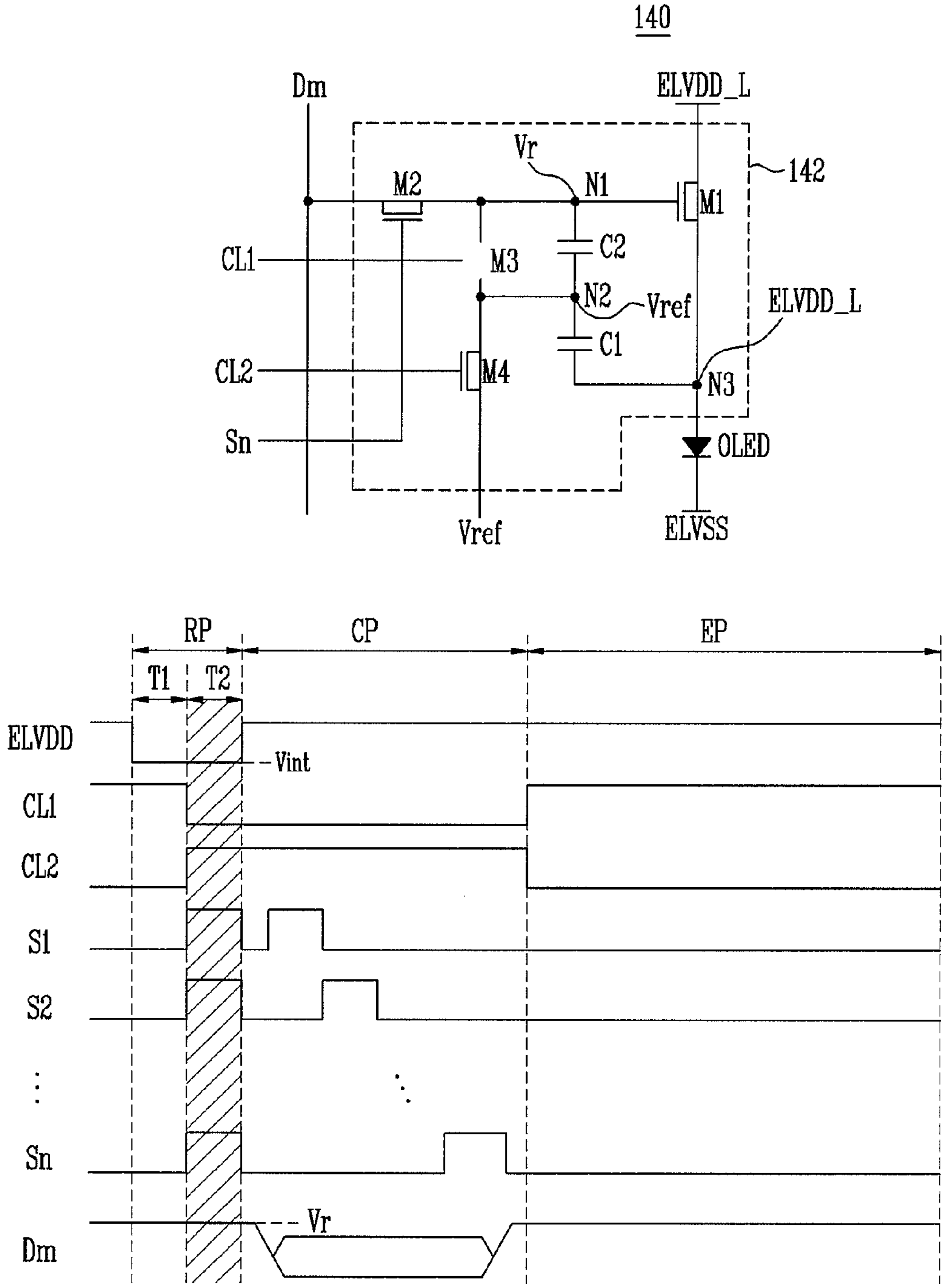

Thereafter, as shown in FIG. 4B, the scan signal is simultaneously supplied to each of the plurality of scan lines S1 to Sn during a second period T2 of the reset period RP. Further, a reset voltage Vr is supplied to each of the plurality of data lines D1 to Dm during the second period of the reset period RP. Herein, the reset voltage Vr is set to a voltage at which the first transistor M1 included in the pixel 140 can be switched on. In addition, the second control signal is supplied to the second control line CL2 during the second period T2 of the reset period RP.

When the scan signal is supplied to the scan lines S1 to Sn, the second transistor M2 is switched on. When the second transistor M2 is switched on, the reset voltage Vr from the data line Dm is supplied to the first node N1. At this time, the first transistor M1 is switched on, such that the first low power ELVDD_L is supplied to the third node N3. The first low power ELVDD_L is set to a voltage at which the organic light emitting diode OLED can be turned off, such that unnecessary light is not emitted from the organic light emitting diode OLED. When the second control signal is supplied to the second control line CL2, the fourth transistor M4 is switched on. When the fourth transistor M4 is switched on, the voltage of the reference voltage Vref is supplied to the second node N2.

Figure 4C:
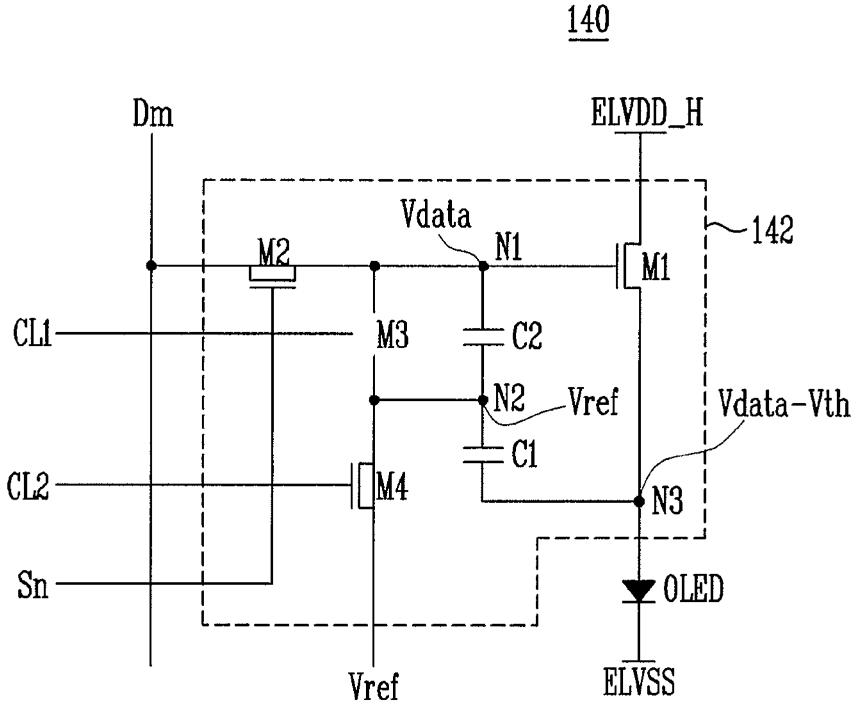
Figure 4C:
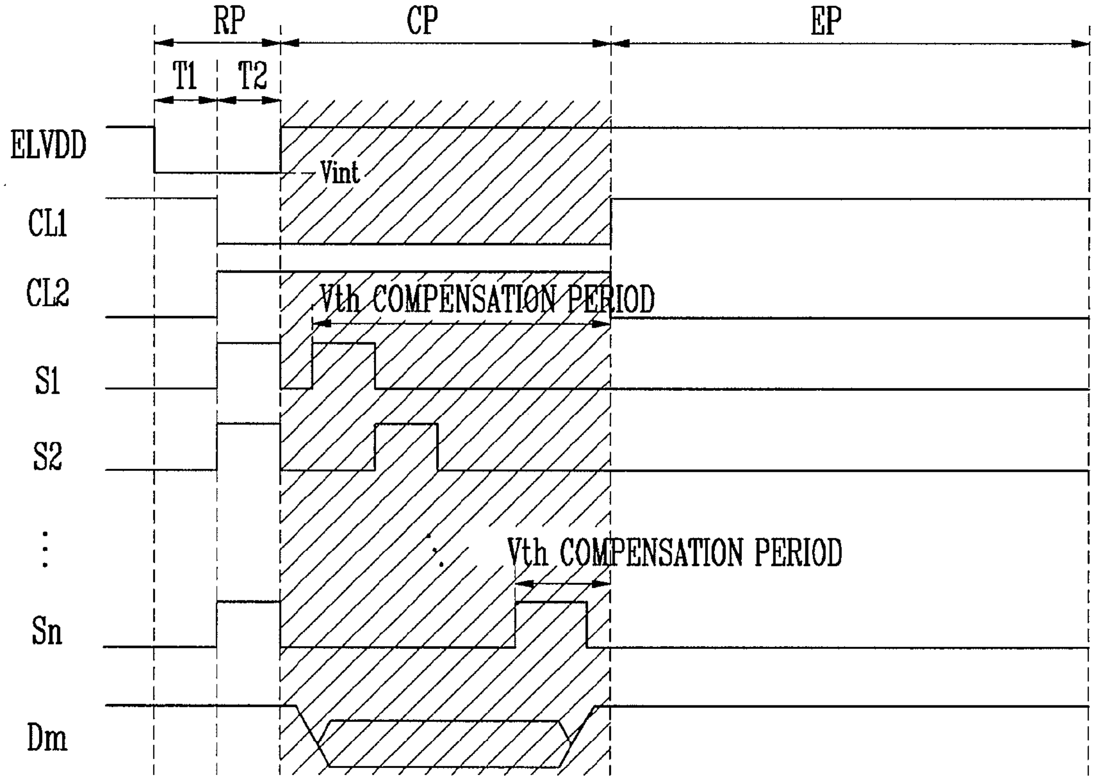

During the compensation period, as shown in FIG. 4C, the scan signal is supplied to the scan lines S1 to Sn in sequence, and the second control signal is supplied to the second control line CL2. In addition, the data signal is supplied to the data lines D1 to Dm. The data signal is synchronized with the scan signal. Further, the first power supply 160 supplies the first high power ELVDD_H.

When the second control signal is supplied to the second control line CL2, the fourth transistor M4 is switched on. In this case, the second node N2 maintains the voltage of the reference voltage Vref. When the scan signal is supplied to the scan line Sn, the second transistor M2 is switched on. When the second transistor M2 is switched on, the data signal is supplied from the data line to the first node N1. At this time, the data signal voltage Vdata is applied to the first node N1. When the data signal voltage Vdata is applied to the first node N1, the voltage of the third node N3 gradually increases up to a voltage resulting from subtracting the threshold voltage Vth of the first transistor M1 from the data signal voltage Vdata.

More specifically, the first low power ELVDD_L applied during the reset period RP is set to a voltage lower than the voltage resulting from subtracting the threshold voltage Vth of the first transistor M1 from the data signal voltage Vdata. Accordingly, when the data signal voltage Vdata is applied to the first node N1, the voltage at the third node N3 gradually increases up to the voltage resulting from subtracting the threshold voltage Vth of the first transistor M1 from the data signal voltage Vdata. Actually, even after the scan signal to the scan line Sn is no longer supplied, thereby switching off the second transistor M2, the first node N1 is maintained at the data signal voltage Vdata due to the second capacitor C2. This results in the voltage at the third node N3 increasing up to the voltage resulting from subtracting the threshold voltage Vth of the first transistor M1 from the data signal voltage Vdata. In an embodiment of the present invention, for stable driving, a sufficient time is allocated to the compensation period CP so that the voltage at the third node N3 included in each of the plurality of the pixels 140 increases up to the voltage resulting from subtracting the threshold voltage of the first transistor M1, Vth(M1), from the data signal voltage Vdata.

Meanwhile, during the compensation period CP, a voltage Vref−Vdata is charged in both ends of the second capacitor C2, and a voltage Vref−Vdata+Vth(M1) is charged in both ends of the first capacitor C1.

Figure 4D:
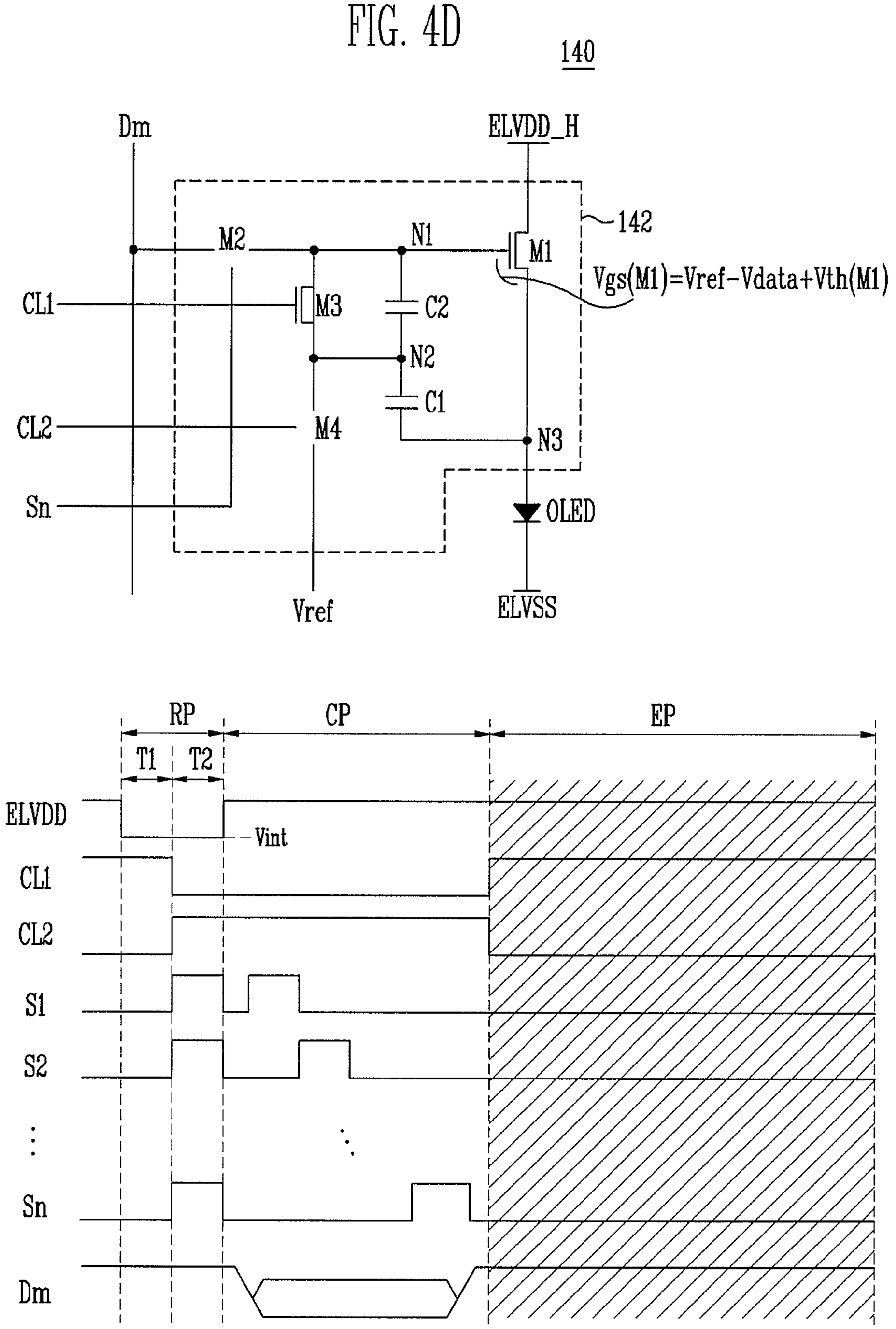

During the emission period EP, as shown in FIG. 4D, the first control signal CL1 is supplied. When the first control signal CL1 is supplied, the third transistor M3 is switched on. When the third transistor M3 is switched on, the first node N1 and the second node N2 are electrically connected to each other. In this case, a difference in voltage of both terminals of the second capacitor C2 is set to 0. A voltage Vgs(M1), which corresponds to the voltage between the gate electrode and the source electrode, also called the second electrode, of the first transistor M1, is set to the voltage charged in the first capacitor C1. That is, the voltage between the gate electrode and the second electrode of the first transistor M1 Vgs(M1) is set as shown in Equation 2.

$$Vgs(M1)=Vref-V\text{data}+Vth(M1) \quad \text{Equation 2}$$

The amount of current flowing to the organic light emitting diode OLED, $I_{OLED}$, is set as shown in Equation 3 by the voltage Vgs of the first transistor M1, where β is a constant.

$$Ioled=\beta(Vgs(M1)-Vth(M1))^2=\beta\{(Vref-V\text{data}+Vth(M1))-Vth(M1)\}^2=\beta(Vref-V\text{data})^2 \quad \text{Equation 3}$$

Referring to Equation 3, the current flowing to the organic light emitting diode OLED is determined by difference in voltage between the reference voltage Vref and the data signal voltage Vdata. Since the reference voltage Vref is a fixed voltage, any change in the current flowing to the organic light emitting diode OLED, $I_{OLED}$, is determined by a change in the data signal voltage Vdata. In addition, in an embodiment of the present invention, as shown in Equation 3, an image having uniform luminance can be displayed regardless of any variability among the threshold voltages of the first transistors M1, Vth(M1), included in each of the plurality of pixels that make up the organic light emitting display device.

Figure 5:
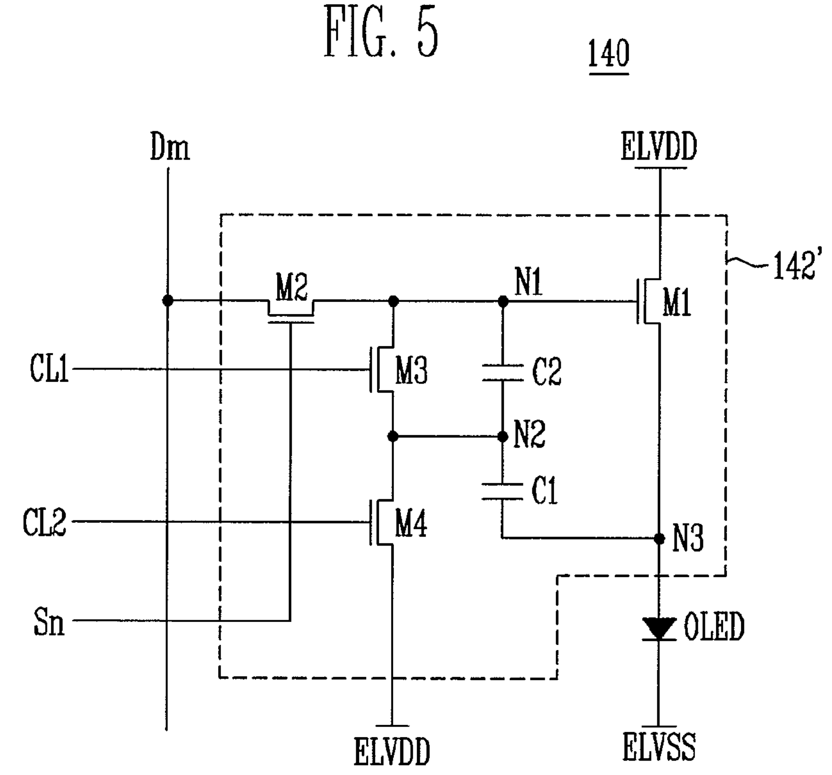
FIG. 5 is a circuit diagram showing a pixel according to a second embodiment of the present invention.

FIG. 5 is a diagram showing a pixel according to a second embodiment of the present invention. When FIG. 5 is described, the same reference numerals refer to the same components as those of FIG. 3 and a detailed description thereof will be omitted.

Referring to FIG. 5, a pixel 140 according to the second embodiment of the present invention includes a pixel circuit 142' and an organic light emitting diode OLED. Herein, a first electrode of a fourth transistor M4 included in the pixel circuit 142' is connected to a first power ELVDD and the rest of the components are established similarly as the pixel shown in FIG. 3.

When the first electrode of the fourth transistor M4 is connected to the first power ELVDD, voltage levels of a first high power ELVDD_H, a first low power ELVDD_L, and a data signal voltage Vdata are set as shown in Equation 4.

$$ELVDD\_H \geq V\text{data} > ELVDD\_L \quad \text{Equation 4}$$

Referring to Equation 4, the data signal voltage Vdata is set to a voltage equal to or lower than the first high power ELVDD_H. That is, the pixel 140 according to a second embodiment of the present invention implements a gray level by a difference in voltage between the first high power ELVDD_H and the data signal voltage Vdata. The other detailed operation process is the same as that of the pixel 140 of FIG. 3 and will thus not be provided again.

Figure 6:
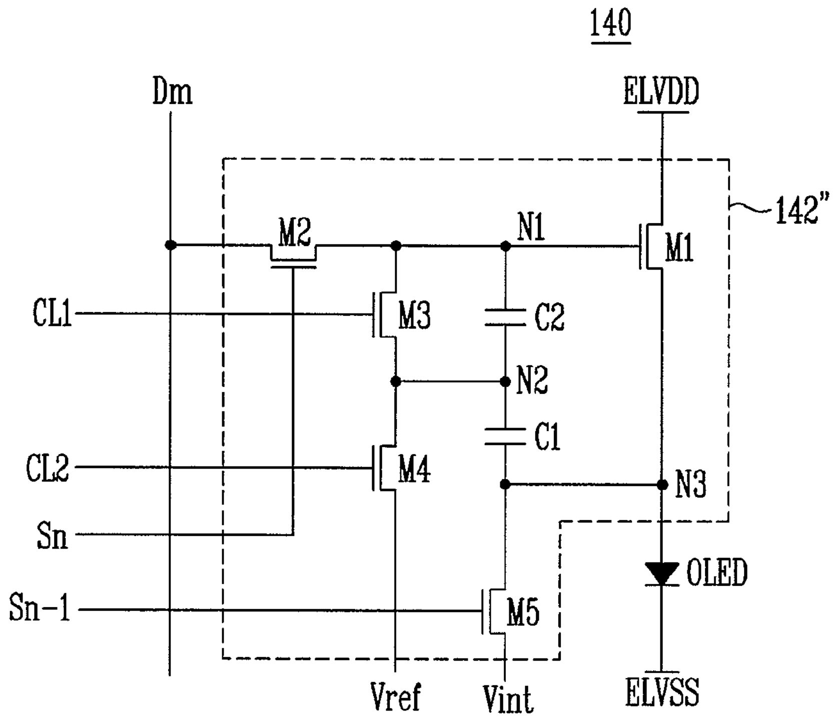
FIG. 6 is a circuit diagram showing a pixel according to a third embodiment of the present invention.

FIG. 6 is a diagram showing a pixel according to a third embodiment of the present invention. When FIG. 6 is described, the same reference numerals refer to the same components as those of FIG. 3 and a detailed description thereof will not be provided again. In addition, a pixel 140 connected to an n-th scan line Sn and an m-th data line Dm is shown for convenience of description.

Referring to FIG. 6, the pixel 140 according to the third embodiment of the present invention includes an organic light emitting diode OLED and a pixel circuit 142".

The pixel circuit 142" is connected between a third node N3 and an initial voltage Vint and includes a fifth transistor M5 that is switched on when a scan signal is supplied to an n−1 scan line Sn−1. When the fifth transistor M5 is switched on, initial voltage Vint is supplied to the third node N3. In this case, the voltage of the first power ELVDD maintains the voltage of the high level during a frame period. The voltage level including the initial voltage Vint is set as shown in Equation 5.

$$ELVDD > Vref \geq Vdata > Vint \quad \text{Equation 5}$$

Referring to Equation 5, the initial voltage Vint is set to a voltage lower than the data signal voltage Vdata. Actually, the initial voltage Vint is set to the voltage resulting from subtracting the threshold voltage of the first transistor M1, Vth (M1), from the data signal voltage Vdata.

Figure 7:
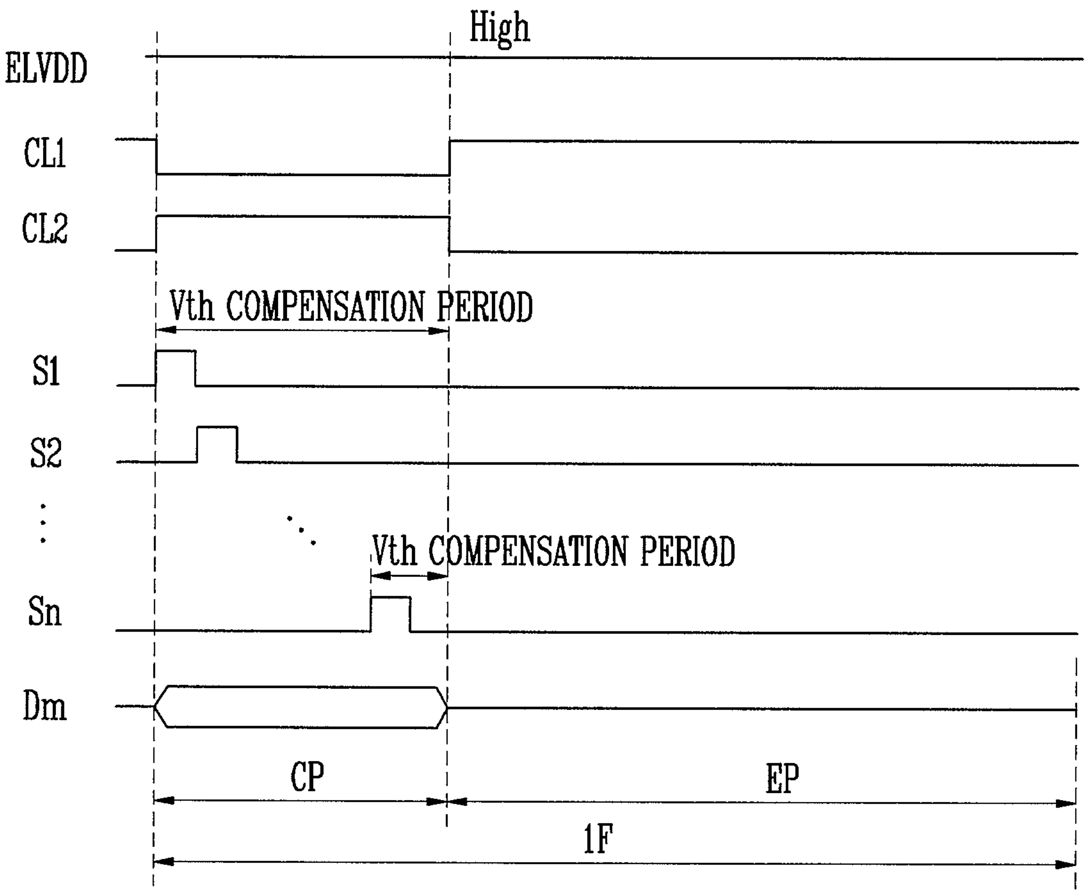
FIG. 7 is a waveform diagram showing an embodiment of a driving method of a pixel shown in FIG. 6.

FIG. 7 is a waveform diagram showing an embodiment of a driving method of a pixel shown in FIG. 6.

Referring to FIG. 7, during a compensation period CP, the scan signal is supplied to the scan lines S1 to Sn in sequence and a second control signal is supplied to a second control line CL2. In addition, the data signal is supplied to the data lines D1 to Dm. The data signal is synchronized with the scan signal.

When the second control signal is supplied to the second control line CL2, a fourth transistor M4 is switched on. When the fourth transistor M4 is switched on, the reference voltage Vref is supplied to the second node N2. In addition, when the scan signal is supplied to the n−1-th scan line Sn−1, the fifth transistor M5 is switched on. When the fifth transistor M5 is switched on, the voltage at the third node N3 is set to the initial voltage Vint.

Thereafter, when the scan signal is supplied to the n-th scan line Sn, the second transistor M2 is switched on. When the second transistor M2 is switched on, the data signal is supplied from the data line to the first node N1. At this time, the data signal voltage Vdata is applied to the first node N1. When the data signal voltage Vdata is applied to the first node N1, the voltage at the third node N3 gradually increases up to a voltage resulting from subtracting the threshold voltage of the first transistor M1, Vth(M1), from the data signal voltage Vdata. Herein, the compensation period CP is set to a sufficient time so that the voltage at the third node N3 included in each of the pixels 140 increases up to the voltage resulting from subtracting the threshold voltage of the first transistor M1, Vth(M1), from the data signal voltage Vdata.

Meanwhile, during the compensation period CP, a voltage Vref−Vdata is charged in both ends of the second capacitor C2, and a voltage Vref−Vdata+Vth(M1) is charged in both ends of the first capacitor C1.

During the emission period EP, a first control signal CL1 is supplied. When the first control signal CL1 is supplied, the third transistor M3 is switched on. When the third transistor M3 is switched on, the first node N1 and the second node N2 are electrically connected to each other. In this case, the difference in voltage of both terminals of the first capacitor C1 is set to 0, and a voltage Vgs(M1) between the gate electrode and the source electrode of the first transistor M1, also called the second electrode of the first transistor M1, is set to the voltage charged in the first capacitor C1. That is, the voltage between the gate electrode and the second electrode of the first transistor M1, Vgs(M1), is set as shown in Equation 2. Accordingly, the current flowing to the organic light emitting diode OLED is determined by the difference in voltage between the reference voltage Vref and the data signal voltage Vdata as shown in Equation 3.

Figure 8:
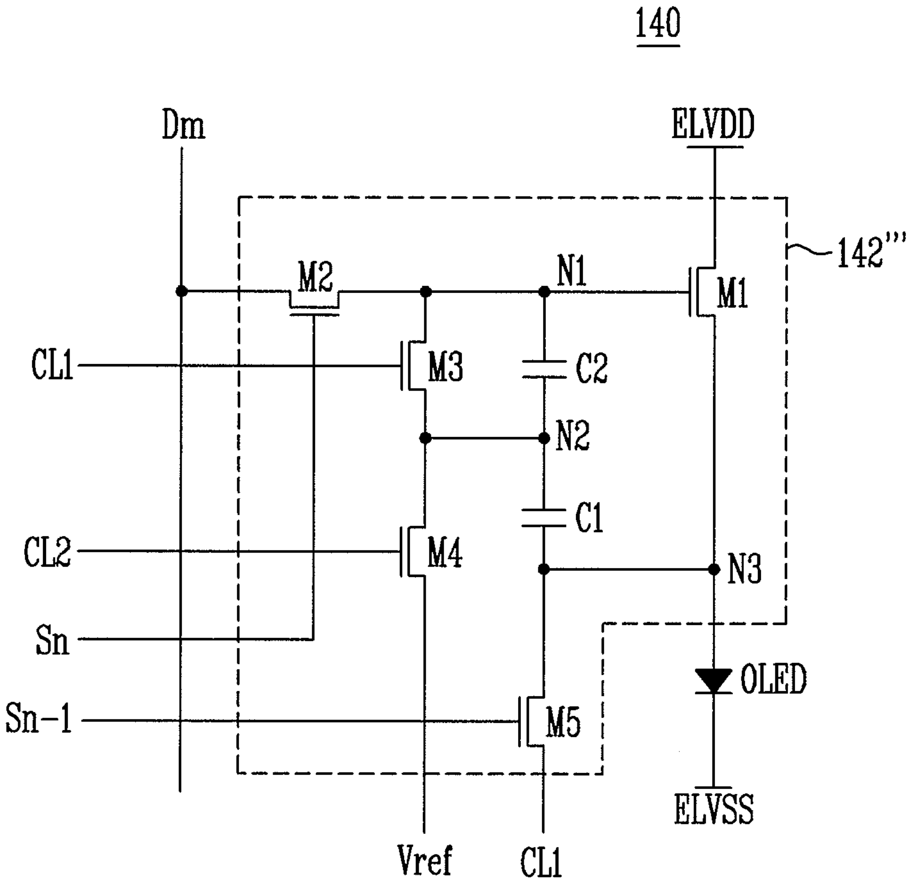
FIG. 8 is a circuit diagram showing a pixel according to a fourth embodiment of the present invention.

FIG. 8 is a diagram showing a pixel according to a fourth embodiment of the present invention. When FIG. 8 is described, the same reference numerals refer to the same components as those of FIG. 6 and a detailed description thereof will not be provided again.

Referring to FIG. 8, a pixel 140 according to the fourth embodiment of the present invention includes a pixel circuit 142'" and an organic light emitting diode OLED. A second electrode of a fifth transistor M5 included in the pixel circuit 142'" is connected to a first control line CL1.

In this case, the fifth transistor M5 is switched on when a scan signal is supplied to an n−1-th scan line Sn−1 to supply a voltage from the first control line CL1 to a third node N3. When the first control signal is not supplied, the first control line CL1 is set to a voltage that is lower than a voltage resulting from subtracting a threshold voltage of the first transistor M1, Vth(M1) from a data signal voltage Vdata. The other operation processes are the same as the FIG. 6 and a detailed description will not be provided again.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device, comprising:

a plurality of pixels at crossing regions of a plurality of scan lines and a plurality of data lines;

a first control line and a second control line commonly connected with the plurality of pixels;

a control line driver configured to supply a first control signal to the first control line and a second control signal to the second control line, wherein the second control signal is not concurrent with the first control signal; and a first power supply configured to supply a first power to each of the plurality of pixels, wherein a voltage level of the first power is configured to change at least once during a frame period for each of the plurality of pixels, wherein the first power supply is configured to supply the first power at a low level during a reset period of the frame period and configured to supply the first power at a high level during a compensation period and an emission period of the frame period, wherein the control line driver is configured to supply the second control signal to the second control line during the compensation period and a second period of the reset period, and is configured to supply the first control signal to the first control line during the emission period and a first period of the reset period, and wherein each of the plurality of pixels comprises:

an organic light emitting diode comprising an anode electrode;

a first transistor connected between the first power and the organic light emitting diode;

a second transistor connected between one of the plurality of data lines and a gate electrode of the first transistor, wherein the second transistor is configured to be switched on when a scan signal is supplied to one of the plurality of scan lines;

a third transistor connected between the gate electrode of the first transistor and a reference voltage, wherein the third transistor is configured to be switched on when the first control signal is supplied to the first control line;

a fourth transistor that is connected between the third transistor and the reference voltage, wherein the fourth transistor is configured to be switched on when the second control signal is supplied to the second control line;

a first capacitor connected between the anode electrode of the organic light emitting diode and a common node of the third transistor and the fourth transistor; and a second capacitor connected between the common node and the gate electrode of the first transistor.

2. The organic light emitting display device of claim 1, wherein the reference voltage is a voltage greater than or equal to data signal voltages supplied to the plurality of data lines during the compensation period.

3. The organic light emitting display device of claim 1, wherein the first power at the low level is a voltage lower than a voltage resulting from subtracting a threshold voltage of the first transistor from a data signal voltage.

4. A driving method of an organic light emitting display device, comprising:

setting a voltage of an anode electrode of an organic light emitting diode included in each of a plurality of pixels at an initial voltage during a reset period of a frame period;

applying a data signal to a gate electrode of a driving transistor included in each of the plurality of pixels during a compensation period after the reset period of the frame period;

maintaining a common node at a reference voltage during the compensation period, wherein the common node is located between a first capacitor and a second capacitor, and the first capacitor and the second capacitor are connected in series between the gate electrode of the driving transistor and the organic light emitting diode; and applying a current corresponding to the data signal to the organic light emitting diode during an emission period after the compensation period of the frame period.

5. The driving method of the organic light emitting display device of claim 4, wherein the setting of the voltage of the anode electrode comprises:

decreasing a voltage of a first power ELVDD to the initial voltage;

applying a scan signal simultaneously to a plurality of scan lines; and applying a reset voltage to a plurality of data lines during a period when the scan signal is supplied.

6. The driving method of the organic light emitting display device of claim 5, wherein the reset voltage is set to a voltage at which the driving transistors of each of the plurality of pixels can be switched on.

7. The driving method of the organic light emitting display device of claim 4, wherein the applying of the data signal to the gate electrode of the driving transistor comprises:

sequentially applying a scan signal to a plurality of scan lines; and supplying the data signal to a plurality of data lines, wherein the data signal is synchronized with the scan signal.

8. The driving method of the organic light emitting display device of claim 7, wherein the initial voltage is set to a voltage lower than a voltage resulting from subtracting a threshold voltage of the driving transistor from a voltage of the data signal.

9. The driving method of the organic light emitting display device of claim 7, wherein when the data signal is supplied to the gate electrode of the driving transistor, the voltage of the anode electrode of the organic light emitting diode increases up to the voltage resulting from subtracting a threshold voltage of the driving transistor from a voltage of the data signal.

10. The driving method of the organic light emitting display device of claim 7, wherein the reference voltage is set to a voltage greater than or equal to a voltage of the data signal.

11. The driving method of the organic light emitting display device of claim 4, wherein the applying of the current corresponding to the data signal comprises:

electrically connecting the second capacitor between the gate electrode of the driving transistor and the first capacitor;

electrically connecting the first capacitor between the second capacitor and the organic light emitting diode;

electrically connecting first and second ends of the second capacitor; and supplying to the organic light emitting diode the current corresponding to the data signal applied to the gate electrode of the driving transistor.

12. The driving method of the organic light emitting display device of claim 4, wherein during the setting of the voltage of the anode electrode and the applying of the data signal to the gate electrode of the driving transistor, each of the plurality of pixels is set to a non-emission state and wherein during the applying of the current corresponding to the data signal, each of the plurality of pixels is set to an emission state.

* * * * *